March 30, 1965 E. DE BOER 3,176,160

TUNNEL DIODE CIRCUIT ARRANGEMENT

Filed Sept. 24, 1962

INVENTOR
EELTJE DE BOER
BY
AGENT

United States Patent Office — 3,176,160 — Patented Mar. 30, 1965

United States Patent Office 3,176,160

Patented Mar. 30, 1965

3,176,160

TUNNEL DIODE CIRCUIT ARRANGEMENT

Eeltje De Boer, Emmasingel, Eindhoven, Netherlands, assignor to North American Philips Company, Inc., New York, N.Y., a corporation of Delaware Filed Sept. 24, 1962, Ser. No. 225,816
Claims priority, application Netherlands, Sept. 26, 1961, 269,611
3 Claims. (Cl. 307—88.5)

The invention relates to a circuit arrangement including a tunnel diode. As is well known, a tunnel diode has two stable states, one of which is a condition of high current and low voltage and the other of which is a condition of small current and high voltage. In many circuit arrangements for pulse and digital applications, for example for logic or counting operations, the series circuit of an inductance and an ordinary diode having the same pass direction as the tunnel diode is connected in parallel with the tunnel diode.

However, known circuit arrangements of this kind require for proper operation a transistor and a comparatively large number of passive network elements in addition to the tunnel diode.

It is the object of the present invention to provide a reliably operating circuit of the above type in which the number of active and passive elements may be considerably reduced. The circuit arrangement in accordance with the invention comprises a comparatively small number of elements and, according to a principal aspect thereof, in the condition of small current and high voltage of the tunnel diode, the ordinary diode (hereinafter called diode) is adjusted at a differential resistance which is small compared with that of the tunnel diode. This arrangement is such that an input pulse applied to the circuit arrangement gives rise to a current through the series circuit such that at the end of the pulse a voltage pulse is generated across the inductance which brings the tunnel diode back into its condition of high current and low voltage.

The invention is based on the recognition of the fact that with pulses having proper values the diode passes only every second pulse of a pulse train. The leading edge of a current pulse which is passed by the normal diode has a slope of finite value; therefore, a voltage is built up across the inductance which increases with time but drops rapidly to zero for the pulse duration owing to the presence of the associated circuit including both diodes and the load resistance. The trailing edge of the said current pulse which is passed by the diode produces a voltage pulse across the inductance having a polarity opposite to that of the voltage built up across the inductance by the leading edge and restores the circuit arrangement to the original condition.

In order that the invention may readily be carried into effect, an embodiment thereof will now be described, by way of example, with reference to the accompanying diagrammatic drawings, in which.

Figure 1:
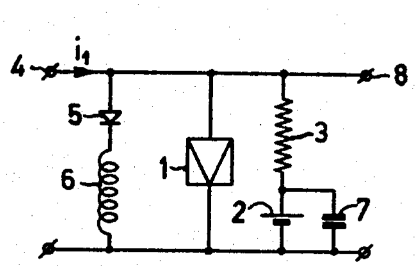
FIGURE 1 is the circuit diagram of an embodiment of the circuit arrangement in accordance with the invention.

In FIGURE 1 a tunnel diode 1 is adjustable by means of a voltage source 2 shunted by a large capacitor 7 and a load resistor 3, to one of the stable points A and B (FIG. 2) of its current-voltage characteristic; in the example shown the adjustment is to the point A. If now a positive-going current-pulse of suitable value is applied to a terminal 4 the tunnel diode 1 passes to the stable condition B. The series circuit of an ordinary rectifying diode 5 and an inductance 6 is connected in parallel with the tunnel diode 1 and any current flow in the series circuit is negligible, since, at the very low voltage at which the tunnel diode 1 is in the stable condition A, the diode 5 has a resistance which is very large compared to that of the tunnel diode 1.

If a second positive-going current pulse is applied to the terminal 4, however, the diode 5 allows a relatively considerable amount of current to pass since, at the voltage associated with the stable condition B, the differential resistance of this diode is small whereas the differential resistance of the tunnel diode is now large. (In order to enhance this condition, it may be desirable to connect a small D.C. voltage source in series with the diode 5.) The leading edge of the said second positive-going current-pulse produces a positive voltage $V_L$ across the inductance 6 which, for example, increases almost exponentially. For the pulse duration the voltage across the inductance 6 falls off owing to the presence of the circuit comprising the resistor 3, the tunnel diode 1 and the diode 5. At the beginning of the trailing edge of the pulse the voltage across the inductance has disappeared almost entirely so that the trailing edge of the pulse produces a negative-going voltage pulse across the inductance 6. This negative-going voltage pulse causes the tunnel diode 1 to pass from the stable condition B to the stable condition A, i.e., to the initial condition.

Hence it is seen that two successive positive-going current pulses are required to produce one voltage pulse at the output.

Figure 2:
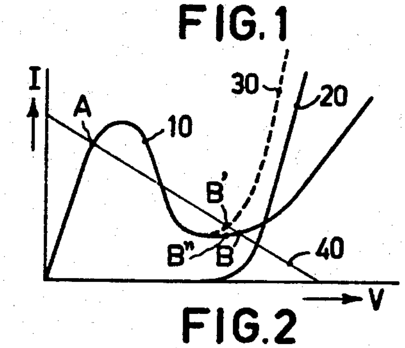
FIGURE 2 shows current-voltage characteristic curves illustrating the operation of the said embodiment and FIGURE 3 shows the variation of the voltage across the inductance and the variation with time of the current pulses applied to the tunnel diode and of the voltage pulses produced across the tunnel diode respectively.

FIGURE 2 shows the current-voltage characteristic curve of the tunnel diode 10 and the characteristic curve 20 of the diode 5. A load line 40 intersects the curve 10 at the stable points A and B. Due to the small current flowing through the diode 5 at the voltage associated with the point B, the parallel connection of the diodes causes the current flowing to the tunnel diode 1 to adjust itself to a value corresponding to a point B″ situated on the curve 10 directly below the point of intersection B′ of the load line 40 with a curve 30 which shows the total current flowing through the diode 5 and the tunnel diode 1 as a function of the voltage.

Figure 3:
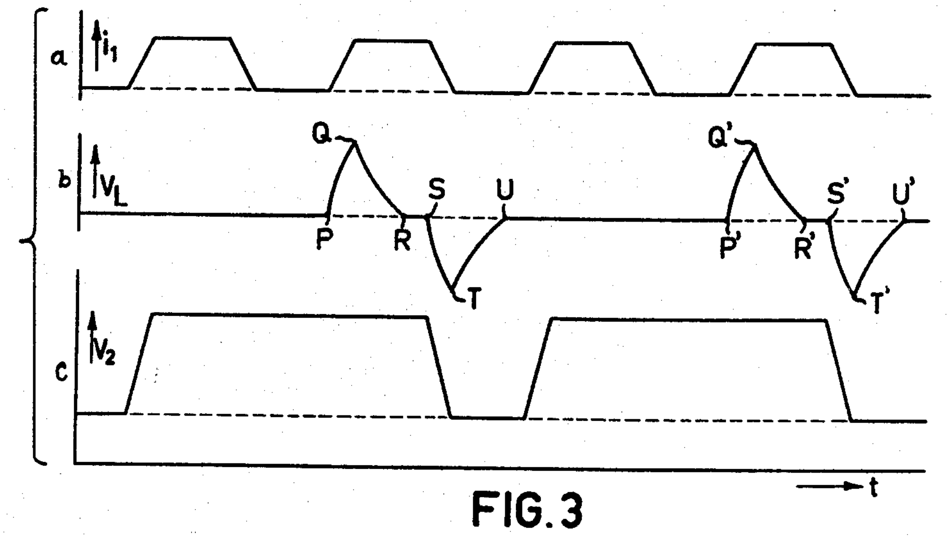

In FIGURE 3 current pulses $i_1$ applied to the input terminal, voltage pulses $V_L$ produced across the inductance 6 by the current pulses $i_1$ and voltage pulses $V_2$ appearing at an output terminal 8 are plotted one above the other as a function of time and are indicated as *a*, *b*, and *c*, respectively. The part PQ (P′Q′) of curve *b* indicates the positive voltage $V_L$ which is set up across the inductance 6 at the second pulse of each pair of current pulses applied to the terminal 4; this part increases approximately exponentially; the part QR (Q′R′) shows the variation of $V_L$ due to the provision of the circuit comprising the tunnel diode, the normal diode and the load resistor; the part ST (S′T′) shows the variation of $V_L$ during the trailing edge of the current pulses $i_1$.

In a practical embodiment of the circuit arrangement shown in FIGURE 1 the tunnel diode was a Ge-tunnel diode whose valley point and peak point voltages were about 300 mv. and about 70 mv. respectively and whose valley point and peak point currents were about 1 ma. and about 10 ma. respectively; the load resistor 3 was 47 ohms; the capacitor 7 had a value of 1 $\mu$f., the voltage source 2 had a value of 400 mv.; the diode 5 was a junction diode of the type OA9; the inductance 6 had the value of about 20 $\mu$h.

Triangular current pulses having a value of about 2 ma. and a repetition frequency of 200 kc./s. were applied to the input terminal 4. Voltage pulses having a repetition frequency of 100 kc./s. and a value of about 250 mv. were taken from the output terminal 8.

A voltage pulse source may be connected in series with the load resistor 3 as an alternative to a current pulse source connected to the input terminal 4.

Obviously negative-going current pulses may also be applied to the input terminal. In this case, in the circuit diagram of FIGURE 1, both the polarity of the diodes 1 and 5 and that of the voltage source 2 must be reversed.

It is to be noted that the diode 5 may of course be the emitter-base path of a transistor, the emitter of which is connected to the inductance 6. In this case, pulses may be taken from a load in the collector circuit of the transistor as well as from the tunnel diode 1.

Obviously, many modifications and variations of the present invention are possible in the light of the above teachings. It is therefore to be understood that, within the scope of the appended claims, the invention may be practiced otherwise than as specifically described. It is also to be noted that the quantitative values given above are provided only to enable ready practice of the invention and are not intended to be limiting thereof in any respect.

What is claimed is:

1. A tunnel diode circuit arrangement comprising: an input terminal, a common terminal, and an output terminal, an inductance and a diode connected in series combination in parallel with said input and common terminals and in parallel with said output and common terminals, a tunnel diode connected in parallel with said series combination, said diode and tunnel diode being connected with the same pass direction, and means for coupling a load impedance to said output terminal, said diode having a differential resistance which is low relative to that of the tunnel diode in the condition of low current and high voltage.

2. A pulse counter comprising: an input terminal, a common terminal, and an output terminal, means for applying input pulses to said input terminal, an inductance and a diode connected in series combination in parallel with said input and common terminals and in parallel with said output and common teminals, a tunnel diode connected in parallel with said series combination, said diode and tunnel diode being connected with the same pass direction, said diode having a differential resistance which is low relative to that of the tunnel diode in the condition of low current and high voltage, whereby current flows through said series combination upon the occurrence of every second input pulse and acts to generate a voltage pulse across said inductance.

3. A circuit arrangement comprising: an input terminal, a common terminal and an output terminal, an inductance and a diode connected in series combination in parallel with said input and common terminals and in parallel with said output and common terminals, a two-terminal device with a characteristic having a negative-resistance portion and first and second stable portions of high current and low voltage and low current and high voltage respectively, said two-terminal device being connected in parallel with said series combination, said diode having a differential resistance which is low relative to that of the two-terminal device in the condition of low current and high voltage.

References Cited by the Examiner

UNITED STATES PATENTS 3,115,585 12/63 Feller et al. ........... 307—88.5

OTHER REFERENCES

RCA Technical Note No. 500 by Bergman, September 1961.

ARTHUR GAUSS, *Primary Examiner.*